United States Patent [19]

Furukawa

[11] Patent Number: 5,514,497

[45] Date of Patent: *May 7, 1996

[54] PASTE NICKEL ELECTRODE PLATE AND A STORAGE BATTERY INCLUDING AN ELECTROCONDUCTIVE MATERIAL

[75] Inventor: Jun Furukawa, Iwaki, Japan

[73] Assignee: Furukawa Denchi Kabushiki Kaisha, Yokohama, Japan

[*] Notice: The term of this patent shall not extend beyond the expiratin date of Pat. No. 5,441,833.

[21] Appl. No.: 444,862

[22] Filed: May 19, 1995

Related U.S. Application Data

[63] Continuation-in-part of Ser. No. 173,075, Dec. 27, 1993, Pat. No. 5,441,833.

[30] Foreign Application Priority Data

Dec. 24, 1992 [JP] Japan .................................. 4-357501

[51] Int. Cl.$^6$ .................................................. H01M 10/28
[52] U.S. Cl. .......................... 429/223; 429/232; 423/592; 427/126.6
[58] Field of Search ...................................... 429/232, 223; 423/592; 427/126.6

[56] References Cited

U.S. PATENT DOCUMENTS 5,441,833   8/1995   Furukawa ................................ 429/223

Primary Examiner—Prince Willis, Jr.
Assistant Examiner—Carol Chaney
Attorney, Agent, or Firm—Breiner & Breiner

[57] ABSTRACT

A paste nickel electrode plate comprising a porous metal substrate filled with a mixture of a nickel hydroxide powder used as an active material and a CoO powder used as an electroconductive material wherein the CoO powder has a covering layer containing hydroxyl groups on the surfaces of the powder particles to prevent the formation of $Co_3O_4$ on the surfaces of the CoO powder particles. A storage battery is provided using the above-described paste nickel electrode plate as a positive electrode.

10 Claims, No Drawings

PASTE NICKEL ELECTRODE PLATE AND A STORAGE BATTERY INCLUDING AN ELECTROCONDUCTIVE MATERIAL

RELATED APPLICATION

This application is a continuation-in-part of Ser. No. 08/173,075, U.S. Pat. No. 5,441,833, filed Dec. 27, 1993.

FIELD OF THE INVENTION

The present invention relates to a paste nickel electrode plate used in a storage battery, a storage battery and an electroconductive material therefor.

BACKGROUND OF THE INVENTION

Sintered and paste positive nickel electrodes for use in an alkaline storage battery, such as a nickel-hydrogen battery, a nickel-cadmium battery and the like, are known. The paste electrodes in particular have drawn attention since it is possible to provide a high-capacity battery using paste electrodes.

However, as compared with sintered nickel electrode plates, paste nickel electrode plates are less advantageous with respect to their coefficient of utilization and rapid discharge characteristics. To increase the conductivity and coefficient of utilization while minimizing the polarization of the paste electrodes, a paste nickel electrode plate has been proposed wherein during manufacture a nickel (Ni) powder is added to a cobalt oxide (CoO) powder or the like to form an electroconductive material which is mixed with an aqueous thickener solution. This mixture is kneaded together to form a paste. A porous metal base plate or substrate is filled with the paste and the pasted substrate then dried and roll-pressed.

It has been found that when a CoO powder is used as an electroconductive material, the coefficient of utilization of the electrode is lowered due to the formation of $Co_3O_4$ on the surfaces of the particles of the CoO powder. Thus, CoO powder conventionally is manufactured in a process wherein a Co compound, such as cobalt hydroxide, is burned or baked in a nitrogen gas atmosphere to form CoO. The resultant CoO powder is then cooled with nitrogen gas. However, if the CoO powder is left in the ambient atmosphere for a long period of time or if a paste electrode plate containing the CoO powder is exposed to the ambient atmosphere for a long period of time, the surfaces of the CoO powder are oxidized and $Co_3O_4$ is formed thereon. Accordingly, when CoO powder manufactured by conventional methods is used as an electroconductive material in a paste nickel electrode, a lower coefficient of utilization results.

BRIEF DESCRIPTION OF THE INVENTION

The present invention provides a paste nickel electrode plate for use in a storage battery having an improved coefficient of utilization. According to this invention a paste nickel electrode plate is prepared by filling a porous metal substrate with a mixture comprising a nickel hydroxide powder as an active material, and a CoO powder as an electroconductive material wherein the CoO powder is treated so as to provide hydroxyl groups on the exterior surface of the particles. More specifically, a covering layer on the exterior surface of the powder particles is formed by treating the CoO with steam to provide a covering layer having hydroxyl groups within its structure. The covering layer is formed by the water molecules of the steam and the CoO of the powder particle to result in the presence of cobalt hydroxide, CoOOH, and/or a combination of cobalt hydroxide and CoOOH on the surface of the CoO particles. The cobalt hydroxide can either be in the form of cobalt (II) hydroxide, i.e., $Co(OH)_2$, or cobalt (III) hydroxide, i.e., $Co(OH)_3$ which is believed to be $Co_2O_3 \cdot 3H_2O$. However, cobalt (II) hydroxide predominates over cobalt (III) hydroxide. The presence of hydroxyl (OH) groups in relation to the exterior surface of the powder particles serve to protect the CoO portion of the powder particles from exposure to the ambient atmosphere and oxygen which is dissolved in an alkaline electrolyte solution used in a storage battery. The CoO, therefore, remains active. The manner in which the hydroxyl groups is provided on the surfaces of the CoO powder particles is described hereinafter.

When a paste nickel electrode plate containing the CoO powder protected with hydroxyl groups is used as a positive electrode in an alkaline storage battery, the CoO powder is changed to $HCoO_2^-$ ions in an alkaline electrolyte solution. The diffusion of the $HCoO_2^-$ ions in the positive electrode can be carried out satisfactorily so that a uniform electroconductivity throughout the electrode plate is assured thereby bringing about an improved coefficient of utilization of the positive electrode resulting in an increased battery capacity and improved rapid discharge characteristics.

DETAILED DESCRIPTION AND PRESENTLY PREFERRED EMBODIMENTS

A preferred embodiment of an electroconductive material according to the present invention is provided as follows. A cobalt compound, generally any cobalt salt, cobalt oxide or the like, is used as a raw material and this raw material introduced into a baking furnace. An inert gas, such as nitrogen gas, is also introduced into the furnace and the cobalt compound heated at a high temperature, preferably at 900° C. or higher, in the inert gas atmosphere for a length of time sufficient to carry out thermal decomposition of the cobalt compound and obtain CoO powder having a purity of 98% or higher. Immediately after the CoO is formed or after the CoO formed has been cooled to room temperature while in the inert gas atmosphere, steam is introduced into the furnace to make the inert gas atmosphere therein appropriately moist, i.e., preferably the inert gas atmosphere is provided with a humidity of about 60%, and the CoO maintained in the atmosphere containing moisture and inert gas. Thereafter, the CoO powder at room temperature is removed from the furnace. In this manner, CoO powder is provided with a covering layer containing OH groups on the surfaces of the powder particles due to the reaction of the water molecules from the moisture present in the inert atmosphere with the CoO powder particles. Thus, a CoO powder is produced having a covering or protective layer containing OH groups. It is preferable that CoO powder according to the present invention is treated sufficiently so that the CoO powder has about 90% or more of the surface area of its particles covered with the protective layer of OH groups.

The covering layer of OH groups prevents the formation of an oxide of a higher order, such as $Co_3O_4$ or the like, on the powder even when the powder is contained in a positive electrode plate as an electroconductive material and left exposed to the ambient atmosphere, or the positive electrode is brought into contact with oxygen dissolved in an electrolyte solution. As a result, the CoO powder is protected from the potential deterioration of the powder's electroconductivity and activity. This insures stable performance with respect to the electroconductivity and activity of the material over a long period of time. The CoO powder according to the present invention, therefore, is particularly useful for mixing with nickel hydroxide in the manufacturing of a paste nickel electrode plate. The coefficient of utilization of the resultant positive electrode is improved. This is shown by the examples set forth below.

Example 1

A commercially available cobalt hydroxide [$Co(OH)_2$] powder was placed in a treatment container and nitrogen gas introduced into the container. The $Co(OH)_2$ powder was heated at 900° C. for 15 hours in the nitrogen gas atmosphere to thermally decompose the $Co(OH)_2$ powder into CoO powder. Thereafter, the CoO powder was cooled to room temperature in the same inert gas atmosphere. The CoO powder was then treated at 25° C. in a nitrogen gas atmosphere having a humidity of 60% so as to form on the surfaces of the particles a covering layer containing OH groups. The treated CoO powder was removed from the treatment container. The formation of the layer of OH groups was confirmed by means of x-ray photoelectron spectroscopy (XPS).

Comparison Example

For comparison, the same commercially available $Co(OH)_2$ powder was used to form a CoO powder using the same thermal decomposition procedure as described in Example 1. The CoO powder was left exposed to the ambient atmosphere for six months whereby a covering layer of $Co_3O_4$ formed on the surfaces of the particles of CoO. The formation of the $Co_3O_4$ layer was confirmed by means of XPS.

The CoO powder with the OH group covering layer as manufactured in Example 1, and a CoO powder having a $Co_3O_4$ covering layer were each used as an electroconductive material in a small amount in mixture with a nickel hydroxide powder. Each mixture was combined with an aqueous thickener solution to form a paste. A porous metal substrate was filled with each paste in a conventional manner to manufacture a paste nickel electrode plate according to the present invention and a comparative paste nickel electrode plate. The plates were then used in a conventional manufacturing method to produce storage batteries which were compared with each other.

More particularly, five grams of the CoO powder with the protective OH layer and five grams of the comparative CoO powder having a $Co_3O_4$ covering layer were mixed, respectively, with ten grams of a commercially available Ni powder, as sold under the tradename INCO #255, and 85 grams of a commercially available spherical nickel hydroxide powder. Each resultant mixture was combined with 35 grams of a 1% aqueous solution of carboxymethylcellulose (CMC) and kneaded to obtain a paste. Each of the respective pastes was applied to a porous metal base plate. In this example, a foam nickel substrate was used although a fibrous nickel felt substrate or other conventional substrate can also be used. Each paste was applied to the substrate so as to fill the pores of the substrate with the paste. Thereafter, each pasted substrate was dried, sprayed with a PTFE disperse liquid, and roll-pressed to a predetermined thickness to provide a paste nickel electrode plate according to the present invention and a comparative paste nickel electrode plate. The respective paste nickel electrode plates of the examples were each prepared to have a theoretical capacity of 1180 milliampere-hour (mAh).

Both the paste nickel electrode plate according to the present invention and the comparative paste nickel electrode plate manufactured as described above were used as a positive electrode, paired with a negative electrode made of a hydrogen-occlusion alloy in a stacked laminate fashion with a separator interposed therebetween, and rolled into a spiral form to obtain spiral battery elements. Each spiral battery element was inserted into a cylindrical container of the same dimensions. The containers were covered and sealed as soon as an alkaline electrolyte solution having an identical specific gravity of 1.36 was poured into each container. In this manner, an 1100 mAh sealed nickel-hydrogen battery according to the present invention and a comparative counter-part sealed nickel-hydrogen battery were manufactured.

The batteries were charged with a 0.2 Coulomb (C) current at an ambient temperature of 20° C. for 7.5 hours and discharged with the same current to a final battery voltage of 1.0 Volt (V). This charge-discharge operation was repeated twice and, thereafter, the batteries were left at 40° C. for 24 hours and subjected to an initial activation process. After the initial activation process, a capacity test and rapid discharge test as described below were conducted.

In the capacity test, the batteries were charged with 0.2 C current at 20° C. for 7.5 hours and discharged with 0.2 C current to a final battery voltage of 1.0 V. The battery capacity was then measured to determine the coefficient of utilization of each paste nickel electrode.

In the rapid discharge test, the batteries were charged with 0.2 C current at 20° C. for 7.5 hours and, thereafter, discharged with 3 C current to a final battery voltage of 1.0 V to measure the rapid discharge capacity and determine the coefficient of utilization of each paste nickel electrode.

The test results obtained are set forth in Table 1 below.

TABLE 1

| | BATTERY CAPACITY (mAh) | COEFFICIENT OF UTILIZATION (%) | RAPID DISCHARGE CAPACITY (mAh) | COEFFICIENT OF UTILIZATION (%) |
| --- | --- | --- | --- | --- |
| BATTERY OF THE PRESENT INVENTION | 1227 | 104.0 | 1027 | 87.0 |
| COMPARATIVE BATTERY | 1156 | 98.0 | 968 | 82.0 |

As clear from Table 1, the battery of the present invention shows remarkable improvement over the comparative battery with respect to each of the battery capacity and its coefficient of utilization, and the rapid discharge capacity and its coefficient of utilization.

Accordingly, a paste nickel electrode plate according to the present invention containing a CoO powder with a OH group protective layer formed on the surfaces of the powder particles is useful as an electroconductive material. The potential oxidation of the CoO powder particles is thereby prevented and a highly satisfactory and stable activity of the electrode maintained. Therefore, when the paste nickel electrode of the invention is used as a positive electrode in an alkaline storage battery, an improved coefficient of utilization results which leads to improvements with respect to battery capacity and rapid discharge characteristics.

As will be apparent to one skilled in the art, various modifications can be made within the scope of the aforesaid description. Such modifications being within the ability of one skilled in the art form a part of the present invention and are embraced by the appended claims.

It is claimed:

1. A paste nickel electrode plate for a storage battery, comprising a porous metal substrate having the pores thereof filled with a mixture comprising a nickel hydroxide powder and a cobalt oxide powder, said cobalt oxide powder having a covering layer on the surface of the cobalt oxide powder wherein said covering layer is formed by treating cobalt oxide particles with steam.

2. A paste nickel electrode plate for a storage battery, comprising a porous metal substrate having the pores thereof filled with a mixture comprising a nickel hydroxide powder and a cobalt oxide powder, said cobalt oxide powder having a covering layer of cobalt hydroxide and/or CoOOH on the surface of the cobalt oxide powder particles.

3. A storage battery comprising a positive electrode, a negative electrode, an electrode separator, an alkaline electrolyte solution and a container wherein the positive electrode is the electrode plate of either claim 1 or claim 2.

4. A paste nickel electrode plate according to either claim 1 or claim 2 wherein said covering layer covers at least about 90% of the surface area of the cobalt oxide powder particles.

5. A method of manufacturing an electroconductive material comprising subjecting a cobalt compound to thermal decomposition in an atmosphere containing an inert gas to form cobalt oxide powder, and maintaining said cobalt oxide powder in a moist atmosphere containing an inert gas until a covering layer of cobalt hydroxide and/or CoOOH is formed on the cobalt oxide powder particle surfaces.

6. A method according to claim 5 wherein said cobalt compound is a cobalt salt or cobalt oxide.

7. A method according to claim 5 wherein said inert gas is nitrogen.

8. A method according to claim 5 wherein said moist atmosphere containing an inert gas is provided by injecting steam into the atmosphere containing an inert gas.

9. A method according to claim 5 wherein said covering layer covers at least about 90% of the surface area of the powder particles.

10. An electroconductive material prepared according to the method claimed in claim 5.

* * * * *